A. F. FAIRCHILD.
PNEUMATIC TIRE.
APPLICATION FILED OCT. 15, 1919.
1,371,672.
Patented Mar. 15, 1921.
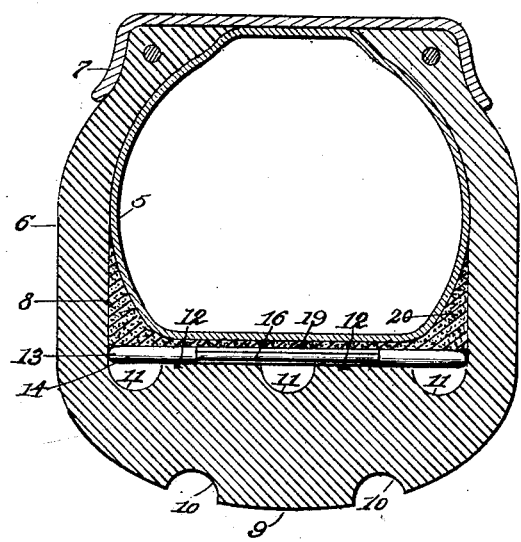
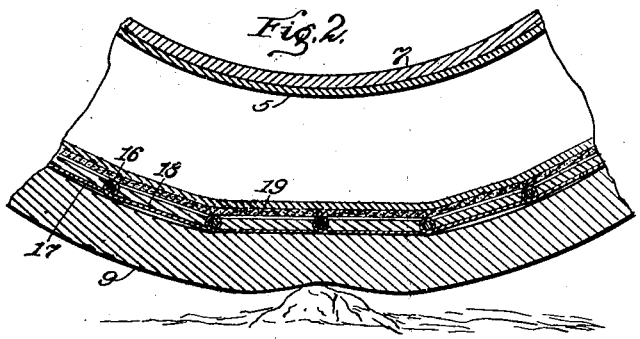
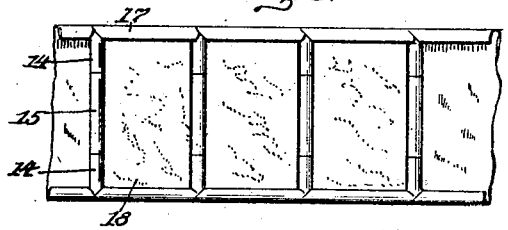

UNITED STATES PATENT OFFICE.

ALSON F. FAIRCHILD, OF DELAVAN, WISCONSIN.

PNEUMATIC TIRE.

1,371,672.  Specification of Letters Patent.  Patented Mar. 15, 1921.

Application filed October 15, 1919. Serial No. 330,858.

*To all whom it may concern:*

Be it known that I, ALSON F. FAIRCHILD, a citizen of the United States, residing at Delavan, in the county of Walworth and State of Wisconsin, have invented certain new and useful Improvements in Pneumatic Tires; and I do hereby declare the following to be a full, clear, and exact description of the invention, such as will enable others skilled in the art to which it appertains to make and use the same.

This invention relates to pneumatic tires, more particularly those used on motor vehicles, the object of the invention being to provide such tires with means for preventing punctures, and of such a nature as not to impair the resiliency of the tire.

The nature of the invention is fully disclosed in the description and claim following, reference being had to the accompanying drawing, in which:

Figure 1 is a cross section of a tire embodying my improvements. Fig. 2 is a longitudinal section of the same. Fig. 3 is a plan view of the puncture-proof band detached.

In the drawing, the numeral 5 denotes the inner tube; 6 the outer casing, and 7 the retaining rim of a pneumatic tire. In practice the casing is preferably made with practically straight side-walls 8, and a thick and sturdy tread portion 9. The solidity of this portion is relieved, however, both outside and inside, by channels 10 and 11, respectively. The outer channels—those nearer the outer side of the tire on the inside—coincide practically with the outer edges of the puncture-proof band, to be described presently, and permit a play of the casing material along such edges, tending to prevent undue friction or abrasion where the casing is most exposed to such action. On the flat interspaces 12 is mounted a puncture-proof band 13, which in practice is made practically as wide as the diameter of the inner tube, and thus protects it from punctures, the danger from lateral punctures above the protective band being negligible. The band is preferably made of sheet steel plates, with hinge lugs 14 on one side and an interposed lug 15 on the other side, the lugs of the intermatching plates being connected by hinge-pins 16. The extended side-wings of the plates 17 are then folded back, holding the pins in place, and also holding rectangular filler-plates 18 in position. The latter plates may be of metal, but if the retaining sheet metal is sufficiently hard, the filler plates may be of softer material, such as wood-fiber, or the like. The band thus formed is in the nature of a flat chain, practically smooth on both the outer and inner sides, and with half-round edges, and so presents to the adjacent parts of the tire no surface adapted to cut or abrade them. It is preferred, however, to interpose between the inner tube and the band a pad or liner 19 of a suitable flexible material, such as a vulcanized fabric, the sides 20 forming fillets to allow for an easy curvature of the walls of the inner tube.

The band should fit rather nicely to the internal circumference of the casing, so that there is practically no end-strain on the band, even when the tire is strongly inflated. There will thus be little wear on the hinge-pins, and no need of any lubricant other than the powdered soap-stone in common use. It is also evident that the band will yield inwardly when the tire passes over stones and other obstructions in the road, and practically the same as would the tread of the casing if the band were absent. The closely hinged plates, however, prevent the entrance of tacks, nails, sharp glass, and the like, and therefore the inner tube remains air-tight indefinitely.

Having thus described my invention, I claim:

In a pneumatic tire, having an inner tube and outer casing substantially as described, a puncture-proof band composed of hinged and interlinked sheet-metal plates, with filler-plates between the hinges, the extended sides of the plates being recurved to form rounded edges and to hold the filler-plates in position.

In testimony whereof I affix my signature in presence of two witnesses.

ALSON F. FAIRCHILD.

Witnesses:
A. H. KENDRICK,
T. H. O'BRIEN.